United States Patent [19]

Joannais

[11] 4,398,230

[45] Aug. 9, 1983

[54] PROTECTION DEVICE FOR ELECTRICAL CONNECTORS

[75] Inventor: Georges Joannais, Boulogne, France

[73] Assignee: Souriau & Cie., Boulogne-Billancourt, France

[21] Appl. No.: 190,065

[22] Filed: Sep. 23, 1980

[51] Int. Cl.$^3$ .............................................. H02H 1/06

[52] U.S. Cl. .......................................... 361/1; 361/2; 339/91 R; 339/12 R; 307/130

[58] Field of Search .................. 361/109, 2, 1, 59, 93, 361/94, 193, 192; 307/326-328, 130, 131, 134, 135, 137, 142; 335/168, 170, 171; 339/91 R, 111, 12 R, 91 P, 45 R; 200/51 R, 51.03, 51.09

[56] References Cited

U.S. PATENT DOCUMENTS

| | | | |
|---|---|---|---|
| 1,082,032 | 12/1913 | Levin | 339/91 R |
| 2,874,336 | 2/1959 | Wannemacker | 361/2 |
| 3,031,589 | 4/1962 | Noirclerc | 361/2 |
| 3,350,675 | 10/1967 | Misencik et al. | 339/12 R |
| 3,465,208 | 9/1969 | Patrickson et al. | 307/130 X |
| 3,569,908 | 3/1971 | Appleton | 339/91 R |

*Primary Examiner*—Patrick R. Salce

*Attorney, Agent, or Firm*—McAulay, Fields, Fisher, Goldstein & Nissen

[57] ABSTRACT

An electrical connector automatically protected against accidental disconnection. The electrical connector is formed from a plug and a base which are capable of being integrated by a fixation device to provide for the cooperation of contact terminals within insulating bodies each of which has at least one passage for at least one lead for connection to one of the contact terminals. The fixation device is associated with a locking device which is adapted to receive an unlocking order only when a detection device does not detect the presence of any current in at least one of the leads.

16 Claims, 20 Drawing Figures

PROTECTION DEVICE FOR ELECTRICAL CONNECTORS

BACKGROUND OF THE INVENTION

1. Field of the Invention

The invention relates to a protection device for an electrical connector. More particularly, the invention is concerned with an electrical connector which is automatically protected against accidental disconnection, and includes a connector equipped with an automatic device which prevents disconnection of the coupled connector as long as an intensity of electric current or an electric voltage can be detected on one of the leads of the connector.

2. Description of the Prior Art

Numerous embodiments of electrical connectors are known of the type comprising a base and a plug which can be integrated with one another by a fixation device, such as for example of the bayonet-type or having a screw-nut assembly, to produce cooperation between the contact terminals equipping the plug and the base, so that the insulating bodies each have at least one passage for at least one electrically conductive member such as an electric lead connected to a contact terminal.

On these known connectors, nothing positively prevents an accidental disconnection. But, an electrical connector is neither a breaker, a switch, nor a cut-off, and the contact terminals of the electrical connector are not designed to serve the functions assigned to the electrical contacts of the aforesaid three types of devices.

The operation of disconnection must be carried out both without current and when no current of a detectable intensity is flowing through any one of the leads associated with the connector.

When there is a disconnection of the connector, it is necessary as a matter of fact to protect (a) the user, (b) the data circulating in the connector, and finally, (c) the connector itself.

Two essential dangers are encountered during such operations on present-day connectors:

1. The electric arc effect which is due to the intensity of the current passing through the connector and which can surprise the user and cause such user to make a blunder. This can result in the insulation being destroyed, the contact terminals becoming eroded, and finally there is also the risk of explosion in a deflagrating medium.
2. The electrocution of the operator due to the presence of a voltage between two points of different potential touched by the user, such as for example a contact terminal with a potential thereon and the ground or neutral which is at a potential different from the contact terminal.

DETAILED SUMMARY OF THE INVENTION

The present invention proposes to overcome the aforesaid problems by providing a protection device for automatically protecting an electrical connector against accidental disconnection. The electrical connector includes two housings each of which has a connection means for connecting the housings together and an electrically conductive member therein each adapted for coupling to each other when the two housings are fitted and held together by their aforesaid connection means and comprises detecting means in the form of a detector disposed in one of the housings for detecting the absence of electrical energy in the electrically conductive member of one of the housings, and means responsive to control by the detector to permit the housings to be disconnected by disconnecting the connection means of each of the housings from each other.

The invention further consists in the provision of an electrical connector system for connecting together and selflocking two housings fitting together in their locked condition. Each housing includes an electrical lead therein which leads are electrically coupled together when the two housings are fitted together in their locked condition, and comprises detection means disposed in at least one of the two housings for determining the absence of electrical fluid in the leads, means responsive to the detection means for permitting the unlocking of the housings from each other, and the responsive means comprises at least one logic gate responsive to the coincidence of two signals to enable the gate to provide a signal for rendering the responsive means operative to permit the unlocking of the housings, one of the two signals being supplied from the detection means, and means are provided for applying an order signal as the other of the two signals.

The responsive means comprises at least one logic gate having a first input which is responsive to a detector signal supplied by the detection means and a second input responsive to an order signal. The logic gate is preferably an "AND" gate.

The detection means includes a pickup which is responsive to electric current circulating in the electrically conductive members.

The pickup responsive to a magnetic field created around the electrically conductive members.

A key can also be provided for supplying the order signal. This key contains a source of energy capable of delivering an electrical control signal to provide the order signal.

SUMMARY OF THE INVENTION

The present invention proposes to remedy these aforesaid serious drawbacks by providing an electrical connector of the type presented above with means automatically to protect against any accidental disconnection.

Other purposes and advantages of the invention will be better understood with the aid of the particular examples of embodiments of the invention which will be described hereinafter in non-limiting fashion with reference to the accompanying drawings, in which:

DESCRIPTION OF THE PREFERRED EMBODIMENTS

Figure 1:
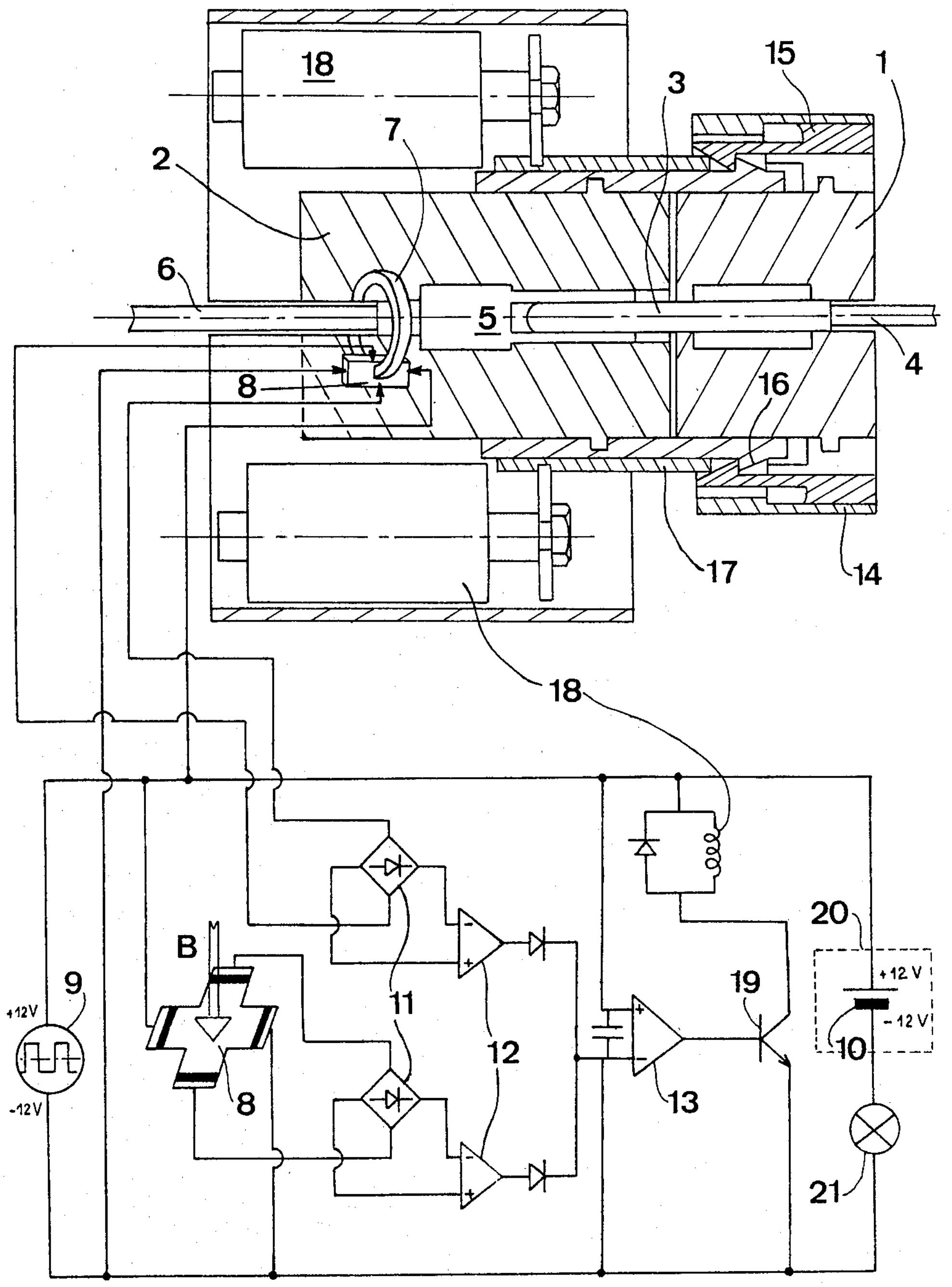
FIG. 1 represents a schematic view of a first automatic device equipping an automatically protected connector wherein the detection device is sensitive to the intensity of the current flowing in a lead.

FIG. 1 shows a connector constituted by a plug 1 which can be integrated with a base 2, for example by insertion of a front, tubular part of plug 1, in a corresponding recess on the front face of base 2. Plug 1 and base 2 each have an insulating body in which contact terminals are respectively received such as for example male contact terminal 3, the rear end of which is connected to leads such as 4, and contact terminals of the female type of corresponding form. The rear ends of terminals 5 are connected to second leads such as 6, and the front ends of terminals 3 and 5 cooperate to insure the connection when plug 1 is mounted on base 2. In the insulating body of base 2, a ferrite torus 7 surrounds each lead such as 6, in order to concentrate the magnetic field lines prevailing around lead 6, when the latter is traversed by an electric current; this magnetic field is directly proportional to the intensity of the electric current.

The ferrite toruses 7 are, for example, made from ferrite marketed under the brand "T 26" and machined by ultrasounds, due to the great hardness and high fragility of this material which has no magnetic remanence. A Hall probe 8, for example of the type "SBV 566" from the SIEMENS company, is disposed with minimal play in a narrow airgap machined in each torus 7, in order to avoid substantial losses of sensitivity. The Hall probes 8 are fed with electric current of 25 mA intensity, delivered by a generator 9 of square current at 20 KHz oscillating between −12 V and +12 V; feed voltages are supplied by a general power pack 10 to which generator 9 is connected. If the current flowing through lead 6 is AC (alternating current), and in view of the fact that the Hall voltage, which constitutes the output signal from the intensity detector constituted by each Hall probe 8, is proportional to the current feeding Hall probe 8, and to the induction of the magnetic field in torus 7, there will be a phenomenon of swings of the Hall voltage. But, if the current in electrically conductive member or lead 6 is DC (direct current), there will possibly be a phase reversal.

In all cases, the Hall voltage delivered by probe 8 is applied to the terminals of a diode rectifier bridge 11 which sends positive pulses of +12 V to an amplifier 12 which is connected to a totalling amplifier 13 for piloting a power circuit designed to produce the unlocking of a locking device. The locking device comprises a ring 14 borne by plug 1 as well as a plurality of elastic claws 15 which are borne by ring 14, and are capable of elastically dogging behind a step 16 borne by base 2. A shoe 17 slides on the front part of base 2 and raises claws 15 to release the lock thus obtained, in the course of its displacement toward the front part of base 2 on which shoe 17 slides, under the thrust of the plunger of electromagnets 18. The coils of electromagnets 18 are fed by the power circuit when transistor 19 is conductive, which is the case as soon as transistor 19 is rendered conductive; transistor 19 is rendered conductive when it is no longer blocked by a signal delivered from amplifier 13, i.e. as soon as there is no current circulating in leads 6, or, at the very least, as soon as the intensity of this current is below the threshold of detection, which is on the order of 100 mA for such a magnetic detection device.

The active control device of the locking device includes the electronic device which is constituted by generator 9, rectifier bridge 11, totaller 12, amplifier 13 and transistor 19, which is situated below the magnetic detection device constituted by Hall probe 8 and ferrite torus 7, and which processes the data it receives therefrom. In case of failure of power to this active control device, for example if power pack 10 is disposed in a key 20 not associated with the device, it is not possible to order the unlocking or unblocking, because the plunger of the electromagnet and the shoe 17 are recalled or returned elastically into initial position, which does not prevent the locking of claws 15 behind step 16.

In this case, it is only after association of key 20 to the connector that the electrode control device, when energized, will interrogate the probe and order or not order the unlocking. If unlocking is ordered, a telltale light 21 borne by the key will indicate to the operator that disconnection is possible.

Figure 3:
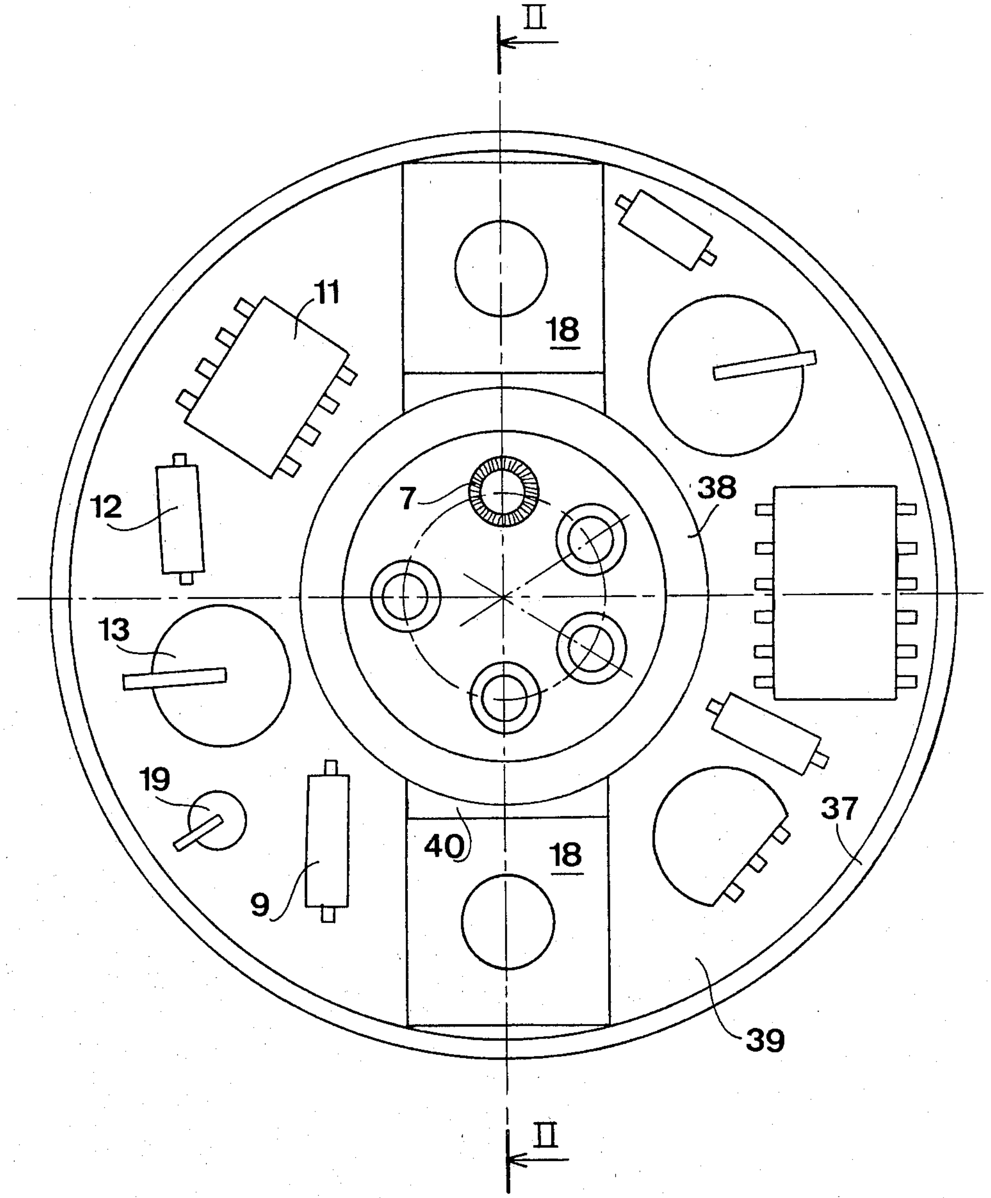
FIG. 3 represents an outside view of the connector taken along arrow F in FIG. 2.
Figure 4:
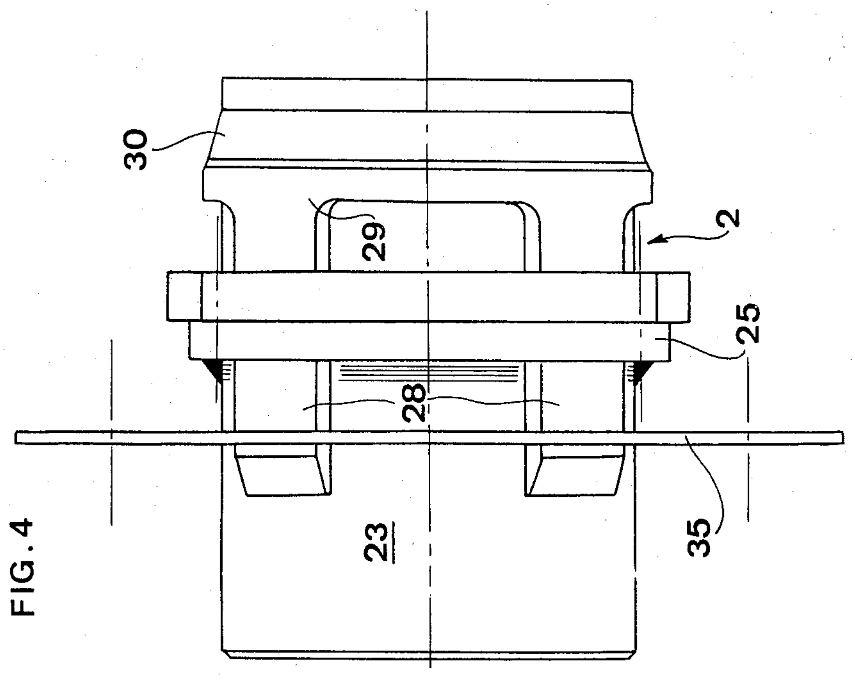
FIG. 4 represents an outside view of the base of the connector according to FIGS. 2 and 3, in unlocked position.
Figure 7:
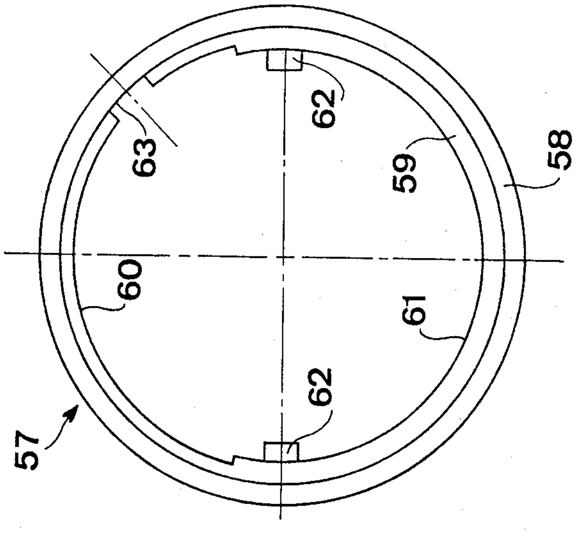
FIG. 7 represents an outside view taken along F in FIG. 6, of the unlocking ring of the connector according to FIG. 6.
Figure 6:
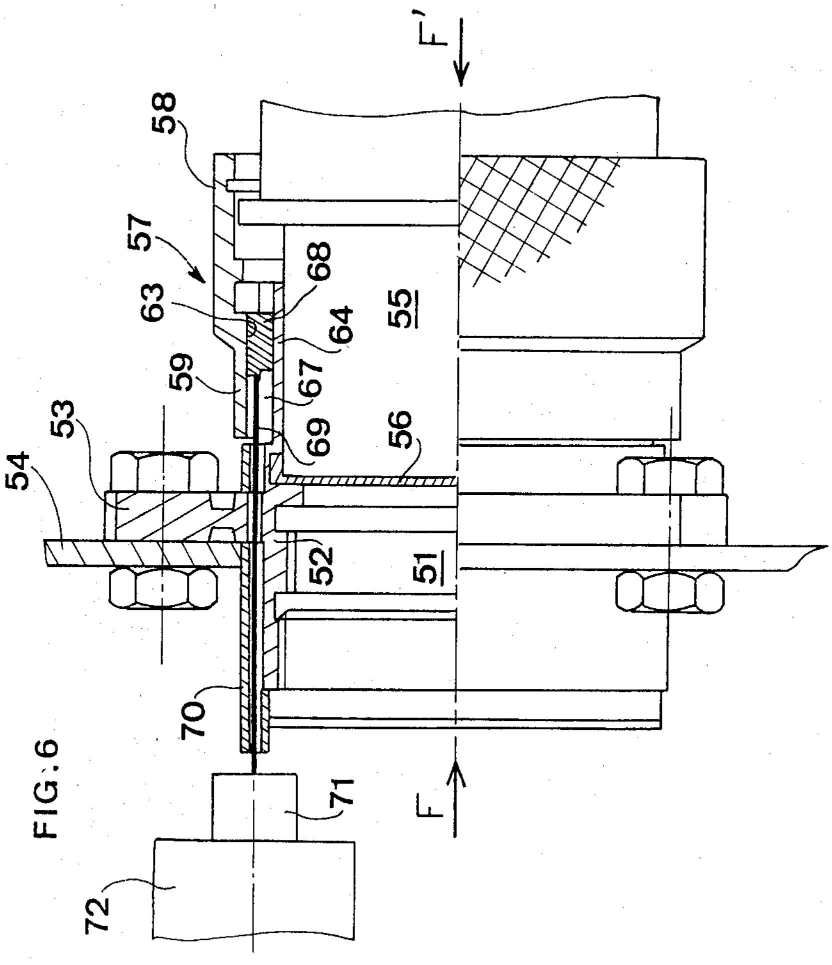
FIG. 6 represents a half-view in axial section taken along line VI—VI in FIG. 8, of the connector equipped according to FIG. 5.
Figure 9:
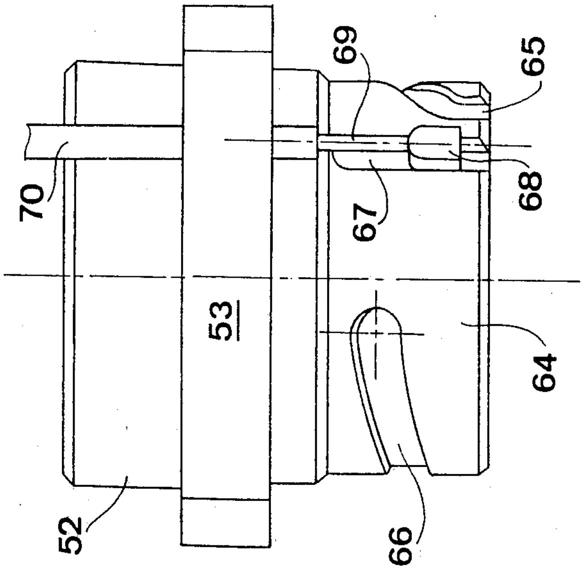
FIGS. 8 and 9 represent, respectively, views along F′ in FIG. 6, and from above of the base of the connector according to FIG. 6.
Figure 8:
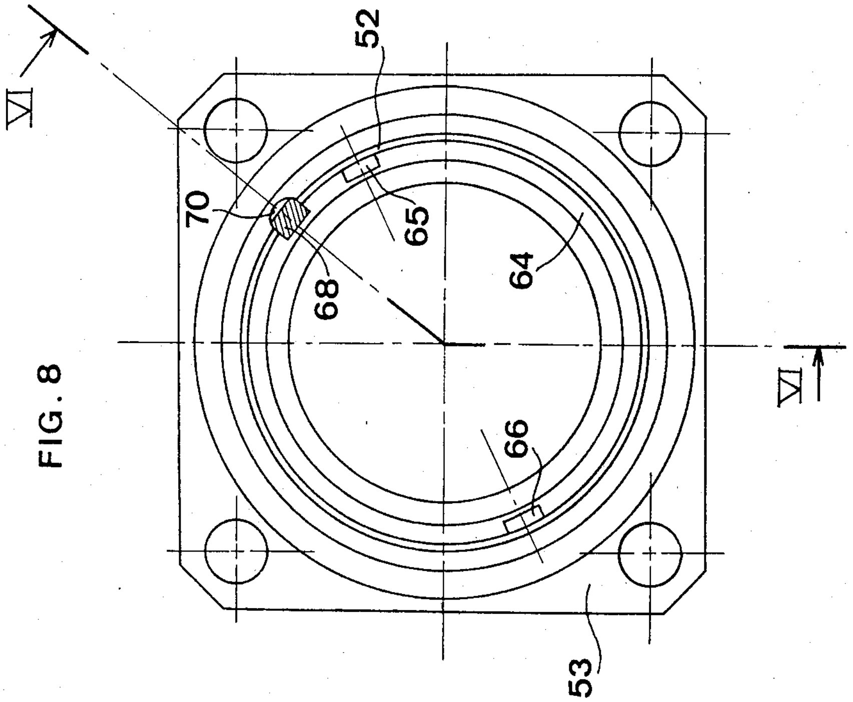

FIGS. 2 to 4 again show a connector whose plug 1 bears ring 14 surrounding the front part 22 of plug 1, this part 22 being introduced into the front part of tubular element 23 of base 2, in position of connection. Base 2 comprises an insulating body 24 whereof a part, represented in exploded view in FIG. 1, is traversed by a recess designed to receive a contact terminal as well as the end of the lead which is connected to the latter. In an enlarged posterior part of the aforesaid recess, there are disposed a ferrite torus 7 and a Hall probe received in an airgap of torus 7. Insulating body 24 is fixed in the rear part of tubular element 23, which is welded to a support plate 25, and has a centering shoulder on a support wall 26, and by which base 2 is fixed to this support wall 26. Four axial passages 27 are provided in support plate 25, and each passage 27 is traversed by one of the four feet 28 of an unlocking shoe 29. Shoe 29 is mounted to slide along the outer surface of tubular element 23, the front part of which has an outside step 30 for limiting the movement of shoe 29 toward ring 14. The latter is constituted by an outside crown 31 and an inside crown 32, between which are retained the feet 33 of four elastic claws 15, equally distributed at 90° from one another around plug 1, and lowered 45° relative to passages 27 and feet 28 of shoe 29, which are, again, equally distributed on the perimeter of base 2. As they dog behind step 30 on tubular element 23, the elastic claws 15 insure the locking of the assembly of plug 1 on base 2 and, a spring 34 presses on the one hand against support plate 25 and on the other hand against an annular disc 35 which is fitted over feet 28 of shoe 29 for repelling the latter toward the rear part of base 2.

Annular disc 35 is fixed on one end of each of the plungers 36 of two electromagnets 18 which are simultaneously fed by the power circuit which is piloted by the electronic control device in FIG. 1, when no current is detected on the leads by each Hall probe. The two electromagnets 18 are lodged in a diametrically opposed position in a housing constituted by an outer shell 37, which in turn is connected to an inner shell 38 borne by the rear part of base 2, by means of a brace 39 having two axial notches for the passage of electromagnets 18 which press on two flat plates 40 on inner shell 38.

The components of the electronic circuit in FIG. 1 are disposed on the rear face of brace 39, and when the electronic circuit of FIG. 1 orders the unlocking of the plungers 36 of electromagnets 18, when the electromagnets 18 are being energized, they repel the disc 35 and, by means of disc 35 move the shoe 29 against the action of spring 34 towards claws 14 which then are raised and are no longer dogged behind step 30. The operator can then, when he wishes, safely proceed to disconnect plug 1 and base 2, since no current is flowing through the leads.

The method of this aforesaid embodiment has the advantage that the electronic device processing the data from the probe is insulated electrically from the contact terminals to be protected. Furthermore, the detection device consumes no energy drawn from the current transmitted by the leads, and it does not disturb the signal transmitted by the latter.

Figure 5:
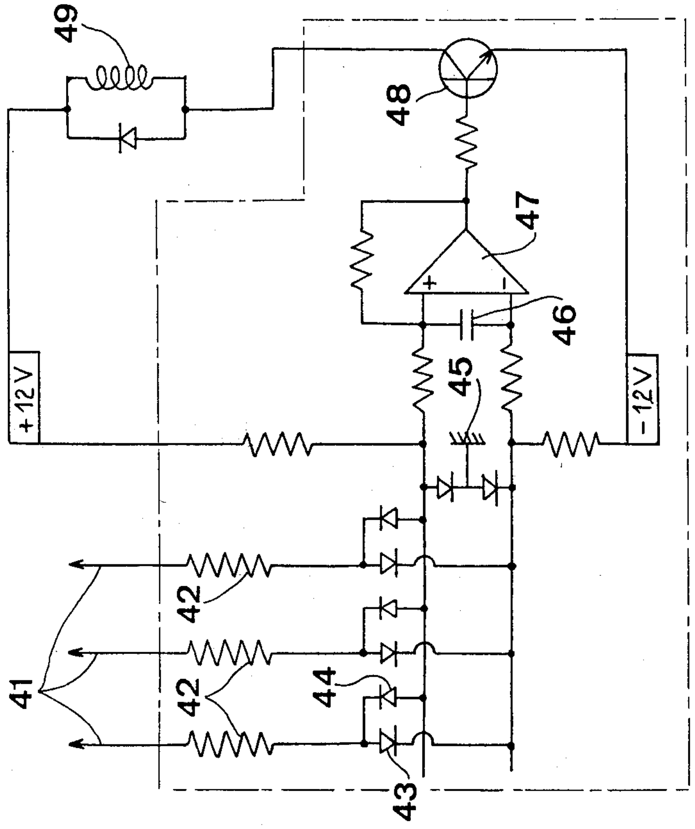
FIG. 5 represents a schematic view of a second automatic device for equipping another automatically protected connector, wherein the detection device is sensitive to the electric voltage between different leads or between one of the leads and the ground or a neutral.

In FIG. 5, the presence of an electric voltage on three leads of a connector (not shown) is detected at the level of the contact terminals of the base, for example, by lines 41 on each of which is mounted a resistor 42 of high value to provide a high input impedance to the electronic circuit.

The output from each resistor 42 is connected to a diode bridge 43, 44 and is connected to or between feed terminals of +12 V and −12 V, between which a fictive neutral 45 is created. The connection is thus made between each contact terminal and the ground, and the presence of a voltage on each lead is discovered by the detection of a fraction of this voltage at the output from diode bridge 43, 44.

These voltage fractions are rectified by the circuit, whether the voltage between the ground and leads is DC or AC.

In so doing, even a voltage insulated from the ground is detected. A totaller 46 then takes into account the sum of the absolute value of the fractions of rectified voltages and is connected to an operational amplifier 47, which blocks or makes (or renders) conductive a transistor 48 so as to serve as a breaker of a power circuit feeding an electromagnet 49 which operates the locking device. The unlocking of the locking device is ordered when the circuit no longer detects any voltage on the leads. In this device, which is operable for all frequencies that may flow through the connected leads, and for voltages ranging from 10 to more than 500 volts, it should be noted that all the elements can be disposed in a key, except for electromagnet 49 which is disposed on the base of the connector, and portions of lines 41 connected to the contact terminals of the base.

Such a key can be linked to the connector, in known manner, by a DIN takeoff, for example, or by means of another small connector to insure transmission of the information with the processing being done in the key, and also insuring control of the electromagnet if unlocking is permitted.

It is, of course, also possible to associate the two detection devices, sensitive to intensity (FIG. 1) and to the voltage (FIG. 5), to control a single locking device equipping a connector, and the protection is thus being reinforced.

FIGS. 6 to 9 show a connector equipped with a locking device of the "push-pin" (push-key) type, different from that of the "clipping" type equipping the connector according to FIGS. 1 to 4, but capable of being operated in the same way by an electromagnet piloted from either of the two detection devices described above.

The connector according to FIGS. 6 to 9, comprises a base formed with an insulating body 51, pierced with passages, (not shown) in which are lodged the contact terminals which are connected with the leads to be connected with each other. The terminals are held in a tubular element 52 integral in its median part with a support plate 53 by means of which the connector is fixed to a support partition 54. The connector also comprises a plug 55. The front part of plug 55 is introduced into the front part 64 of tubular element 52, in its connected position, so that the insulating bodies of the plug and the base will abut one another, but separated by a gasket 56, and the contact terminals are then in position of cooperation. Plug 55 is surrounded by a ring 57 which has a rear part 58 of larger inner and outer diameter, so that the displacements relative to plug 55 are limited by an inside radial stop, and a front part 59 of smaller outer diameter. The inner diameter of front part 59 is over a circular sector 60 larger than it is over the rest of the perimeter and corresponds to a circular sector 61 on which ring 57 has two diametrically opposed nipples 62. And, finally an opening 63 is formed in the front part 59 of ring 57. On the outer face of front part 64 of the base, there are two spiral grooves 65 and 66, which grooves intended to receive nipples 62 of ring 57 to constitute with them, a bayonet locking device of a well known type. But in addition, in the front part 64 of the base, there is an axial groove 67 opening on the front face, in which a pin 68 is controlled by a rod 69 which passes through a guide sleeve 70 and is borne on the outer face of tubular element 52, as well as the base of support plate 53 on element 52. Rod 69 is directly attached to its rear end on the plunger 71 of an operating electromagnet 72 which is supported by the base, in a manner not shown here.

When plug 55 is mounted on the base, and ring 67 is fixed on part 64 of the base by the bayonet attachment device, and if a voltage is detected on a lead by a device according to FIG. 5, electromagnet 72 is not energized so that plunger 71 and rod 69 are pushed toward ring 52 by elastic means (not shown). Pin 68 is then pushed to the inside of opening 63 of the front part 59 of ring 57.

The bayonet fixation device is then locked. It is only in the absence of a voltage on the leads that electromagnet 72 is energized, and upon energization of electromagnet 72, its plunger 71 then draws rod 69 and pin 68 to the rear, unlocking the bayonet device. The user can then disconnect the housings.

During the rotation of ring 57 for disconnection, the stroke of the pin is then limited to the circular sector 60.

Figure 10:
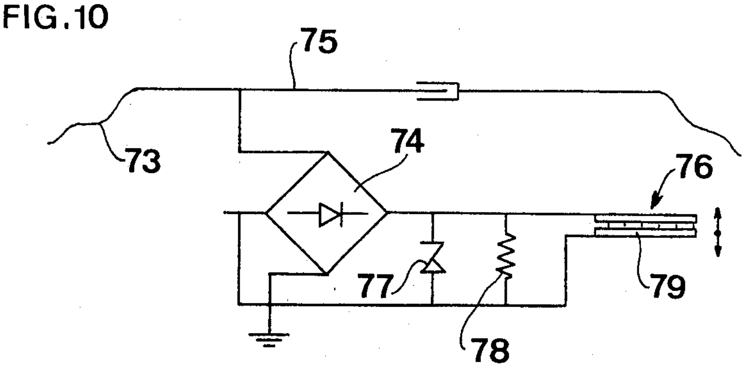
FIG. 10 represents, schematically, and partially, another automatic device detecting the voltage and containing an electret relay.

According to an assembly schematized in FIG. 10, it is also possible to detect the voltage on a lead by means of an electret-type commutation device, of known type. Electrets are well known and are dielectrics carrying electic charges, or of quasi-permanent polarization, and constituting electrostatic equivalents of the magnet, i.e. they are capable of creating a permanent electric field in the space surrounding them.

The known electret-type commutation devices which involve the phenomenon of mechanical instability of an electret placed in a capacitor are constituted by a fixed electrode with which the electret is integrated, and a mobile element which constitutes the other electrode and which appears in the form of a metal blade. According to the value and the sign of the voltage applied between the two electrodes the mobile electrode is either attracted and applied against the electret or the mobile electrode repelled from the electret. If the voltage is eliminated, the commutator will remain in a position which is stable. If the voltage assumes a value opposite to the first value considered, then the commutator will pass into the other input terminal of rectifier 74 is grounded, and by connecting each of the output terminals of rectifier 74 to one of the electrodes of an electret commutator 76, with interposition of a parallel mounting of a Zener diode 77 and a resistor 78 between the two output terminals of rectifier 74, the displacements of mobile electrode 79 of electret commutator 76 are controlled in such a way so as to close or to open a breaker of a power circuit (not shown) according to whether or not a voltage is or is not detected between lead 73 and the ground, the power circuit feeding, for example as described above, at least one electromagnet operating the locking device. In this example, as in the examples described above, relative to the detection of the voltage, it is possible to pilot the locking device in such a way so as to prevent any disconnection of the connector on detecting the voltage between at least one lead and the ground, between two leads, each of which is connected to one of the two contact terminals cooperating with one another in the connector, between any two leads linked to the connector, or between two leads arriving at a single terminal, where the case applies.

By means of electret commutators, it is also possible to detect the intensity of a current flowing through a lead.

Figure 11:
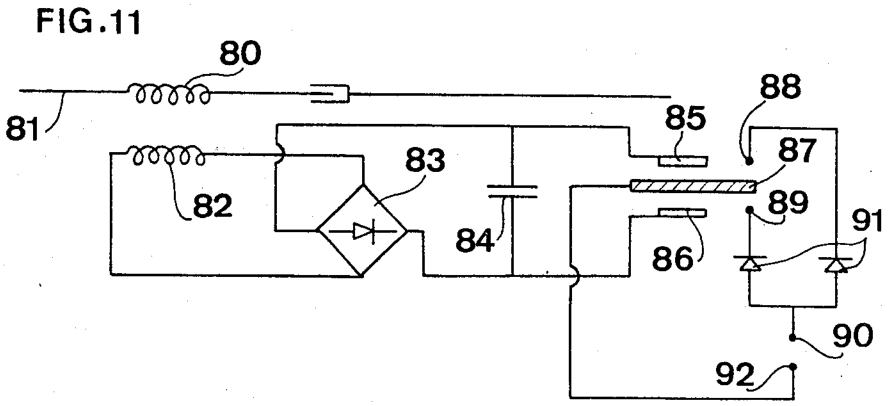
FIG. 11 represents in analogous fashion still another device equipped with an electret relay, but detecting the intensity.

As represented in FIG. 11, the detection device can comprise a coil 80, embodied with or connected with lead 81 itself, if the latter is very fine or connected by one of its ends to lead 81. Coil 80 is connected to one of the contact terminals of the connector and constitutes the primary winding of a transformer, wherein a second coil 82 is associated with the first in the connector and, constitutes the secondary winding, at the terminals of which, voltage pulses equal to or higher than 50 volts are detected either when a current begins to flow or ceases to flow through lead 81. These voltage pulses are rectified in rectifier 83 which is connected to a totaller 84 and to two fixed electrodes 85 and 86, bearing electrets, of a double commutator wherein the mobile electrode 87 is made in the form of a metal blade and is displaced toward either of the fixed electrodes 85 and 86 to come into contact with either of two terminals 88 and 89 which in turn are connected to a terminal 90 of a power circuit (not shown) through two diodes 91, while mobile electrode 87 is connected to another terminal 92 of the power circuit which as discussed above controls the operation of the locking device.

Figure 2:
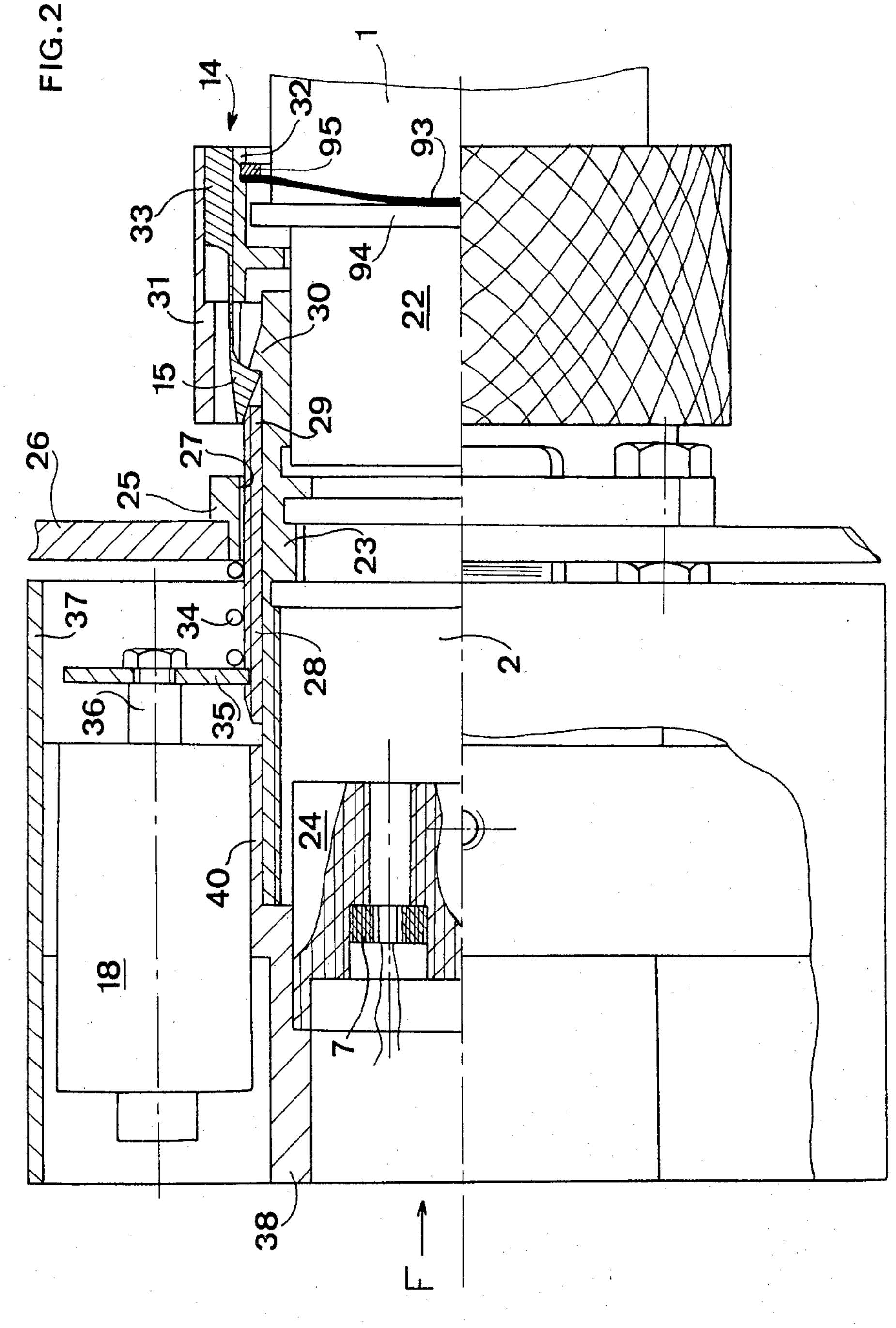
FIG. 2 represents a half-view in axial section taken along II—II in FIG. 3 of the connector equipped with the device according to FIG. 1.
Figure 12:
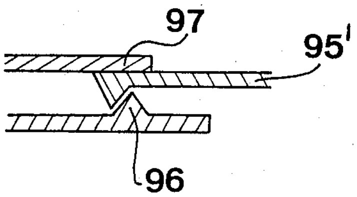
FIG. 12 represents a variation of embodiment of a part of a locking device analogous to the one represented in FIG. 2.

The latter can be of the type comprising a pin displaced by an electromagnet, or it can be of the type comprising elastic claws dogged behind a step, as represented in FIG. 2 and provided with a dogged position of claws 15 maintained to a leaf spring 93 pressing with its central part against a flange 94 on plug 1, and by its perimeter, against a clip 95 mounted in ring 14, so that ring 14 is called or moved back towards the rear part of plug 1, which keeps claws 15 behind step 30 of base 2. But, it is also possible as shown in FIG. 12 to use elastic claws 95' having ahead of conical section, complementary to the section, likewise conical, of step 96, behind which the claws 95' are positively locked by means of a locking cap 97 which is pushed by a spring and surrounds the claws 95', the locking cap 97 being pushed by a spring and surrounding the claws 95'. The locking cap 97 is also drawn by an electromagnet in such a way so as to no longer surround claws 95', which can be disengaged from behind step 96 by a movement of the operator prior to disconnection, or in the course of the latter operation.

Figure 13:
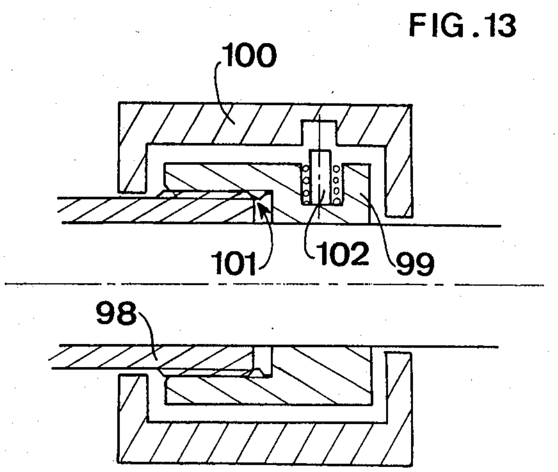
FIG. 13 schematically represents a connector equipped with a declutchable ring to prevent any forced disconnection.

It is also possible to utilize the displacement of the mobile electrode of the electret commutator to act directly onto a locking device. But, since the stresses involved are weak, and the displacement of the mobile electrode is limited, and since, furthermore, the electrostatic force created by the electret on the mobile electrode is always attractive, it is necessary to exert on the latter a return force of mechanical origin, which is created, for example, by means of a spring which permits a very rapid shift from one state to another. It is therefore possible and preferable by means of the mobile electrode to pilot a mechanical bistable flip-flop to insure the locking. In order to improve safety so as to make it impossible to force a locked connector mechanically when a voltage or an intensity of electric current is detected in the connector, it is preferable, as shown in FIG. 13, to add to the two base elements of the connector, i.e. plug 98 and base 99, a ring 100 which envelopes at least the fixation device 101 of plug 98 on base 99, for example a screw and nut, or bayonet device, and associated with a clutch device on the element, for example base 99, by which the ring 100 is borne, so that ring 100 is declutched and can be handled with no risk of disconnection when an electric intensity or voltage is detected, and so that ring 100 is clutched onto the element considered, in the opposite case to permit disconnection. Such a clutch system can include, as shown in FIG. 13, a finger 102 which is recalled elastically to unlocking position and pushed into locking position by an electromagnet.

Figure 14:
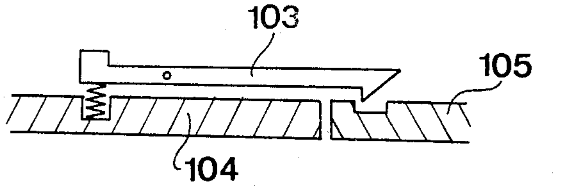
FIGS. 14, 15 and 16, each represent other locking devices.

Generally speaking, as shown in FIG. 14 it is possible to use as a clutch device, systems analogous to those which can be envisaged as a locking device, for example with a clip 103, articulated on one of the elements 104 (plug, base or ring) and elastically pushed into locking or clutching position on another of the elements 105 of the connector by its head which is blocked behind a stop while unlocking can be controlled by an outside magnetic circuit, belonging, for example, to the key, or, where the case applies, the declutching can be controlled as soon as a current is detected by the thrust of a plunger of an electromagnet against the spring that insures the clutching.

Figure 15:
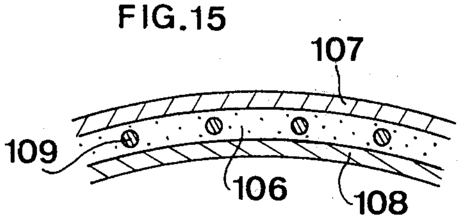

FIG. 15 shows a locking device that constitutes simultaneously the device for detection of a current intensity. This device comprises electromagnetic powder 106 disposed between two basic elements 107 and 108 of the connector in the annular space thus defined between elements 107 and 108 wherein the thickness cannot be cancelled by crushing and displacement of the powder 106 because of rigid longitudinal bars 109 which are linked to one of the elements, such as for example to 107. The electromagnetic powder 106 is sensitive to the magnetic field created by the passage of a current of sufficiently high intensity in the lead, and it solidifies on this occasion to make the two elements 107 and 108 solid in rotation.

Consequently, control of the rotation of element 107, and hence of bars 109 linked to it, entrains the solidified power 106 and hence that of element 108.

Figure 16:
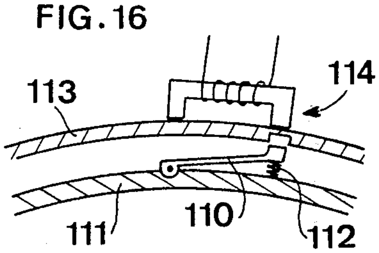

In FIG. 16, the locking or clutching device depending on the solution adopted, comprises a pawl 110 articulated on one of the elements 111 which is respectively pushed by spring 112 into locking position into a recess provided in element 113, or pawl 110 is drawin by spring 112 into a declutching position relative to element 113. The locking or clutching, according to cases, is accomplished in response to control by an outside magnetic circuit 114, respectively to repel or to attract pawl 110 relative to the recess in element 113 when no more current is detected.

Figure 17:
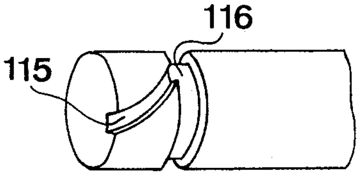
FIGS. 17, 18 and 19 each represent different bayonet-type locking devices comprising a retractable element displaced by an electromagnet to permit unlocking; and, FIG. 20 represents an electret clutch device for a loose ring to prevent any forced disconnection.
Figure 18:
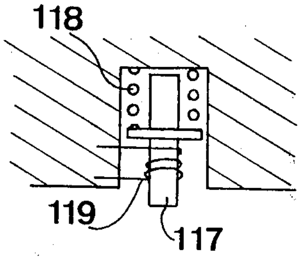

FIGS. 17 and 18 show a bayonet locking device in which a spiral groove 115 is formed in one of the elements of the connector and open into a deeper circular groove 116 which is formed in this same element. In the other elements of the connector cooperating with the one having grooves 115 and 116, a retractable finger 117 is lodged in such a way that a spring 118 applies or urges the retractable finger 117 constantly against the bottom of grooves 115 and 116 when the two elements in question of the connector are assembled on one another. In a locked position, finger 117 is applied against the bottom of deeper groove 116, and any disconnection is impossible since finger 117 cannot be guided in the opposite direction into spiral groove 115. The unlocking is controlled by energizing a coil 119 which surrounds finger 117 in such a way that the latter will be repelled against spring 118, which permits the passage of retracted finger 117, which is in the circular groove 116 from the circular groove 116 to spiral groove 115, and hence disconnection.

Figure 19:
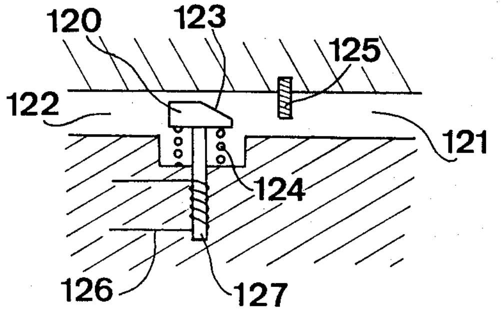

It is also possible to use a bayonet locking device in which the spiral groove is of the same depth. In this case, as shown in FIG. 19, the device can comprise a retractable shoe 120 which is disposed in the element in which spiral groove 121 and circular groove 122 are formed, and wherein the one groove opens into the other. Shoe 120 has an inclined face 123 on the side toward spiral groove 121 in such a way that it will retract into its recess against the action of a spring 124, in response to and under the thrust of nipple 125 which is integral with the other element of the connector when it is guided into the spiral groove 121 on connection, and in such a way that it will come into relief between the two grooves to prevent any retraction of nipple 125 from the time the latter has passed into circular groove 122. Disconnection is possible only after the retraction of shoe 120 into its recess which is controlled by the energizing of a coil 126 surrounding a plunger 127 which is integral with shoe 120.

Figure 20:
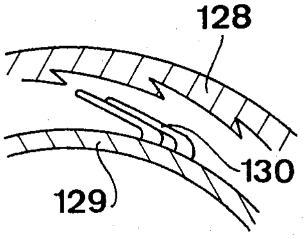

And finally, FIG. 20 shows an embodiment in which a voltage detection device comprising a plurality of electrets also comprising simultaneously means in the form of a clutching device for clutching a ring 128 whose inner face is notched. The clutching device is on an element 129 of the plug or base whose outer face is covered with electrets, and it bears metal blades 130 which constitute as many mobile electrodes of electret relays which, in position of rest, come elastically into notches provided in ring 128 to insure the clutching that permits connection and disconnection, and which when a voltage is detected are drawn toward the electrets of element 129 to insure declutching.

It is clear that, by means of variations and adaptions within the scope of anyone skilled in the art, the various locking devices between a plug and a base, perhaps, by means of a ring, described above, can be arranged in clutching devices between a ring and either of the other two elements, plug or base, depending on the construction of the connector.

It should also be noted that certain automatic intensity-detection devices can be combined with voltage detection devices, so that it is possible to obtain a twofold safety preventing disconnection.

According to the invention it is therefore possible to obtain electrical connectors that are effectively and efficiently protected against any accidental disconnection. When applied to power connectors, the invention makes it possible to embody connects for DC or AC, with a frequency ranging from 25 to 1000 Hz, a voltage of 50 to 380 V and an intensity of 1 to 300 Amperes per class, taking very little power in a permanent regime, and respecting all the constraints proper to known connectors on the levels of tightness, corrosion and vibration, which can be used and disconnected within a wide range of temperatures, and whose volume, in spite of the presence of the detection, data processing, locking and, where the case applies, of feed devices, does not exceed by 20% the volumes of known connectors.

While there has been shown and described what is considered to be the preferred embodiments of the invention, various changes and modifications may be made therein without departing from the scope of the invention.

I claim:

1. A protection device for automatically protecting an electrical connector against accidental disconnection, said electrical connector including two interfitting housings, locking means for locking said housings together and an electrically conductive member therein adapted for coupling to each other when said two housings are fitted and held together by their said locking means comprising:

detecting means disposed in one of said housings for detecting the absence of electrical energy in the electrically conductive member of said one of said housings and for transmitting a detector signal;

means for transmitting an order signal; and responsive means comprising signal summing means having first input responsive to said detector signal and a second input responsive to said order signal whereby said responsive means allows unlocking of said locking means when said detector signal and said order signal are simultaneously present.

2. The protection device of claim 1 wherein said connection means comprises a first mechanical part on one of said housings;

a second mechanical part on the other of said housings, said second part being complementary to said first part, and said first part overlapping said second part when said housings are connected; and said responsive means for disconnecting said housings from each other includes means for creating a repelling force to repel one of said two mechanical parts and to free the passage of the other of said two mechanical parts when said two housings are to be separated from each other.

3. The protection device of claim 2, wherein said repelling force creating means includes an electromagnet responsive to and fed by an electrical signal from said detection means.

4. The protection device of claim 2 wherein said detection means includes pickup means responsive to electric current circulating in said electrically conductive members.

5. The protection device of claim 2, wherein said detection means includes voltage pickup means responsive to a voltage.

6. The protection device of claim 2, wherein said dectection means includes magnetic pickup means responsive to a magnetic field created around said electrically conductive members.

7. The protection device of claim 1, wherein said responsive means controls the disconnection of said housings by permitting said housings to be disconnected from each other by disconnecting the connection means of each of said housings from each other.

8. The protection device of claim 1 or 4, wherein said detection means includes pickup means responsive to electric current circulating in said electrically conductive members.

9. The protection device of claim 1 or 4, wherein said detection means includes voltage pickup means responsive to a voltage.

10. The protection device of claim 1 or 4, wherein said detection means includes magnetic pickup means responsive to a magnetic field created around said electrically conductive members.

11. Electrical connector system for connecting together and self-locking two housings fitting together in their locked condition, each said housing having an electrical lead therein which are electrically coupled together when said two housings are fitted together in their said locked condition, comprising detection means disposed in at least one of said two housings for determining the absence of electricity in said leads;

means responsive to said detection means for permitting the unlocking of said housings from each other;

said responsive means comprising at least one signal summing device responsive to the coincidence of two signals to enable said summing device to provide a signal for rendering said responsive means operative to permit the unlocking of said housings, one of said two signals being supplied from said detection means; and means for applying an order signal as the other of said two signals.

12. The system of claim 11, wherein said summing device has two inputs, one of said two signals being applied to one of said inputs and the other of said two signals being applied to the other of said two inputs.

13. The system of claim 11 or 12, wherein said applying means includes a key for supplying said order signal.

14. The system of claim 13, wherein said key contains a source of energy capable of delivering an electrical control signal to provide said order signal.

15. In a protective device for a connector including a base having a recess therein, a plug fitting in said recess;

inter-engaged electrical contacts in said plug and base;

a magnetic detection circuit for sensing passage of electricity through said contacts and generating a signal in response thereto;

a locking device including a ring around said plug, a plurality of claws borne by said ring;

a step on said base said claws being adapted to elastically dog behind said step;

a shoe slidably mounted on the front part of said base and adapted to raise said claws when displaced;

electromagnets having a plunger engaged with said shoe to displace same when energized;

a transistor connected to said electromagnets;

a power circuit feeding said electromagnets; when said transistor is conductive; and a control device connected to said circuits and said transistor for rendering said transistor conductive when no electricity circulates in said contacts.

16. The connector of claim 15, wherein said magnetic detection circuit comprises a ferrite torus around one of said contacts and a hall probe connected to a generator.

* * * * *